(12) United States Patent
Peng et al.

(10) Patent No.: US 11,945,110 B2
(45) Date of Patent: Apr. 2, 2024

(54) MULTI-DEGREE-OF-FREEDOM CONTINUUM ROBOT WITH FLEXIBLE TARGET GRASPING FUNCTION

(71) Applicant: DALIAN UNIVERSITY OF TECHNOLOGY, Liaoning (CN)

(72) Inventors: Haijun Peng, Liaoning (CN); Jie Zhang, Liaoning (CN); Zhigang Wu, Liaoning (CN); Ziyun Kan, Liaoning (CN); Fei Li, Liaoning (CN); Jinzhao Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 508 days.

(21) Appl. No.: 17/282,656

(22) PCT Filed: Apr. 1, 2020

(86) PCT No.: PCT/CN2020/082686
§ 371 (c)(1),
(2) Date: Apr. 2, 2021

(87) PCT Pub. No.: WO2021/196067
PCT Pub. Date: Oct. 7, 2021

(65) Prior Publication Data
US 2022/0040854 A1 Feb. 10, 2022

(51) Int. Cl.
*B25J 9/06* (2006.01)
*B25J 9/10* (2006.01)
(Continued)

(52) U.S. Cl.
CPC ............... *B25J 9/065* (2013.01); *B25J 9/06* (2013.01); *B25J 9/1045* (2013.01); *B25J 9/1612* (2013.01);
(Continued)

(58) Field of Classification Search
CPC . B25J 9/0021; B25J 9/0075; B25J 9/06; B25J 9/065; B25J 9/104; B25J 9/1045;
(Continued)

(56) References Cited

U.S. PATENT DOCUMENTS 4,685,349 A 8/1987 Wada et al.
4,712,969 A * 12/1987 Kimura .................. B25J 9/0075
414/730

FOREIGN PATENT DOCUMENTS

CN 106313033 A 1/2017
CN 106914888 A 7/2017
(Continued)

*Primary Examiner* — Joseph Brown
(74) *Attorney, Agent, or Firm* — Muncy, Geissler, Olds & Lowe, P.C.

(57) ABSTRACT

A multi-degree-of-freedom continuum robot with a flexible target grasping function comprises a driving device module, a trunk simulation module and a nimble finger module. The trunk simulation module is composed of a rotary compression module and a bending compression module. Each module has a unified connection interface reserved at the end, and is combined and assembled according to actual needs. The driving module is arranged on the base of the robot to realize the driving operation of all cables to control the motion of the robot. The rotary compression module can simultaneously generate the motion in the forms of rotation and compression, thereby compensating for the defect of blind angle of the bending compression module. The bending compression module can realize compression deformation and bending deformation of the module independently. The nimble finger module realizes a grasping function by multi-finger collaboration.

3 Claims, 6 Drawing Sheets

(51) Int. Cl.
*B25J 9/16* (2006.01)
*B25J 15/00* (2006.01)
*B25J 15/10* (2006.01)
*B25J 15/12* (2006.01)
*B25J 18/06* (2006.01)

(52) U.S. Cl.
CPC ........... *B25J 15/0009* (2013.01); *B25J 15/10* (2013.01); *B25J 15/12* (2013.01); *B25J 18/06* (2013.01)

(58) Field of Classification Search
CPC .. B25J 9/1625; B25J 15/0009; B25J 15/0233; B25J 15/08; B25J 15/10; B25J 15/12
See application file for complete search history.

(56) References Cited

FOREIGN PATENT DOCUMENTS

| | | | | |
|---|---|---|---|---|
| CN | 107253188 A | | 10/2017 | |
| CN | 107433618 A | * | 12/2017 | ............ B25J 18/025 |
| CN | 108422411 A | * | 8/2018 | ............ B25J 9/0075 |
| CN | 109591038 A | | 4/2019 | |
| CN | 109877809 A | | 6/2019 | |

* cited by examiner

MULTI-DEGREE-OF-FREEDOM CONTINUUM ROBOT WITH FLEXIBLE TARGET GRASPING FUNCTION

TECHNICAL FIELD

The present disclosure belongs to the technical field of robots, in particular to a continuum robot which can carry out multi-degree-of-freedom movement in a space and realize the functions of flexible grasping for small-size targets and winding for large-size targets, and particularly relates to a multi-degree-of-freedom continuum robot with a flexible target grasping function.

BACKGROUND

At present, the research on the robot technology has become mature, and has been widely used in many fields of industrial production, aerospace and medical treatment of human livelihood. The application of the robot has brought great convenience for human production and life. However, traditional rigid robots, such as industrial mechanical arms, are most widely used in the market. Such robots have only limited degree of freedom and poor deformation capacity, and are difficult to complete the spatial multi-degree-of-freedom winding function.

Compared with the traditional robots, many novel robots researched based on bionics have emerged, including continuum robots designed based on the tensegrity philosophy. Such robots mainly depend on the tension pressure between the rods and the cables to realize self-balance. Through reasonable structural design, various novel robot structures can be designed, such as tensegrity spherical robots. At present, the research and application of the tensegrity robots are still very rare, and the technology is relatively immature. Therefore, it is of great significance to design a multi-degree-of-freedom continuum robot with flexible target grasping function.

SUMMARY

The purpose of the present disclosure is to design a continuum robot which has various motion forms and can adopt different grasping forms for external dimensions of the target, comprising a driving device module I, a rotary compression module II, a bending compression module III and a nimble finger module IV. By using tensegrity concept as a design philosophy, the rotary compression module II with rotational degree of freedom and compression degree of freedom is designed through imitation of a DNA double helix structure. By using tensegrity concept as the design philosophy, the bending compression module III with winding degree of freedom and compression degree of freedom is designed through imitation of a trunk muscle structure. By using tensegrity concept as the design philosophy, the nimble finger module IV which can grasp an object through imitation of the structural function of human fingers. The robot structure has the characteristics of module combination, and can be reasonably combined according to different working conditions to achieve a new robot configuration.

The purpose of the present disclosure is realized by the following technical solution:

A multi-degree-of-freedom continuum robot with a flexible target grasping function is provided. The multi-degree-of-freedom tensegrity robot is supported by a tensegrity structural design philosophy, and a basic structure thereof is formed by combining and assembling a plurality of modules, comprising four parts: a driving device module I, a rotary compression module II, a bending compression module III and a nimble finger module IV. The driving device module I and the rotary compression module II are connected through an upper connecting plate 2; the rotary compression module II and the bending compression module III are connected through a lower connecting plate 8; and the bending compression module III and the rotary compression module II are connected through an interfinger connecting plate 21.

A wire spool, a gear set, a generator set and other elements needed for cables control in the robot structure are integrated in the driving device module I; the generator set is used as a power element; the gear set is used as a speed reducer; the wire spool is installed on a motor spindle to realize a cable winding function; and the above elements are combined to realize centralized control of driving cables I 5, driving cables II 9 and driving cables III 20.

The rotary compression module II is used for realizing circumferential rotation and axial contraction functions of the robot, and comprises a module structure, the driving cables I 5, elastic elements I 7, the upper connecting plate 2 and the lower connecting plate 8. The shape of the module structure is formed by six cross helical hinges imitating a DNA helix structure; each hinge comprises two fixed spherical hinges 3, three movable spherical hinges 4 and four connecting rods 6; twelve fixed spherical hinges 3 are divide equally into 2 groups, and uniformly distributed on the upper connecting plate 2 and the lower connecting plate 8 respectively; the fixed spherical hinges 3 are used as a head and a tail of each hinge; the movable spherical hinges 4 are used as middle hinges; each hinge is connected in series through the connecting rods 6 as connecting members; and a wire through hole through which a wire can pass is arranged beside each spherical hinge. In the module structure, the transverse adjacent movable spherical hinges 4 are connected through the elastic elements I 7, and the longitudinal adjacent movable spherical hinges 4 are connected through the driving cables I 5. The module structure comprises six driving cables evenly distributed along the module structure; one end of each driving cable I 5 successively penetrates through the wire through hole and is fixed on a far end of the module; and the other end is fixed on the motor spindle. Further, two elastic elements I 7, two connecting rods 6 and one driving cable 5 are connected on the periphery of each movable spherical hinge 4.

The bending compression module III is used to realize the winding motion and axial telescopic motion of the robot to wind large-volume targets, and comprises a multilayer tensegrity unit, interlayer connecting rods 11, fixing bolts 13, rotating hinges 14 and the driving cables II 9. The appearance structure of the bending compression module III is formed by splicing multilayer prismatic tensegrity units in series through imitation of horizontal and vertical muscles of trunk muscles; each layer of the tensegrity unit comprises three planar connecting rods 10 and three elastic elements II 12 which are alternately connected; the six parts are alternately arranged to form tensegrity layer units; and adjacent tensegrity layer units are connected through six interlayer connecting rods 11. The rotating hinges 14 are installed on both sides of the interlayer connecting rods 11, and the rotating hinges 14 and the planar connecting rods 10 are connected through the fixing bolts 13. The wire through holes are formed in the planar connecting rods 10; and the bending compression module III penetrates through each small wire through hole longitudinally via six driving cables II 9, and is connected.

The nimble finger module IV is designed through imitation of the characteristics of thick bottom and thin top of a human finger, and comprises three equal-specification fingers and inter-finger connecting plates 21; and the three fingers are distributed on the inter-finger connecting plates 21 to realize the grasping function for a small-volume target. Each finger is respectively composed of a finger root close to the inter-finger connecting plates 21 and a fingertip away from the inter-finger connecting plate 21. The finger root is divided into three layers; each layer is composed of two transverse connecting rods 15 and two elastic elements III 19 which are alternately connected, and two adjacent layers are connected through four finger root oblique connecting rods 16. The basic structure of the fingertip is similar to the structure of the finger root; each layer is composed of two transverse connecting rods 15 and two elastic elements III 19 which are alternately connected, and two adjacent layers are connected through four fingertip oblique connecting rods 18. The fingertips and the finger roots are connected through two finger root oblique connecting rods 16 and two fingertip oblique connecting rods 18. Rotating hinges 17 are installed on both sides of the finger root oblique connecting rods 16 and the fingertip oblique connecting rods 18; the transverse connecting rods 15 and the finger root oblique connecting rods 16 are connected by the rotating hinges 17, and the transverse connecting rods 15 and the fingertip oblique connecting rods 18 are connected by the rotating hinges 17. The wire through holes are formed on both sides of the transverse connecting rods 15; one end of four driving cables III 20 is respectively fixed on the motor, and the other end successively penetrates through the wire through holes on both sides of the transverse connecting rods 15 of the finger roots and the fingertips, and is fixed on the fingertip ends. All parts except the elastic elements III 19 and the driving cables III 20 are regarded as rigid rods. The rigid rods simulate the skeletons of the fingers; the elastic elements III 19 simulate the ligaments of the fingers; and the driving cables III 20 simulate the muscles of the fingers. Three equal-specification fingers are installed on the inter-finger connecting plates to work together to realize the grasping function for the object. Further, the fixed spherical hinges 3 and the movable spherical hinges 4 are made of photosensitive resin and manufactured by a high-precision 3D printing technology.

Further, the connecting rods 6 are connected through the elastic elements I with elastic deformation capacity, and the specific material is a spring, so that the structure has the capacity for storing elastic potential energy.

Further, the planar connecting rods 10 not only play a supporting role in the plane, but also belong to part of the rotating hinges 14.

Further, the interlayer connecting rods 11 not only play an interlayer connection role, but also belong to another part of the rotating hinges 14.

Further, a consistent module interface is adopted among the four modules, so that the structure can be modularly designed, processed and installed.

Further, the driving cables I 5, the driving cables II 9 and the driving cables III 20 are polyethylene nylon cables.

Further, the elastic elements I 7, the elastic elements II 12 and the elastic elements III 19 with elastic deformation capacity are springs.

The use process of the present disclosure is: the driving device module I, the rotary compression module II, the bending compression module III and the nimble finger module IV are assembled according to actual working conditions. The driving cables I 5, the driving cables II 9 and the driving cables III 20 are pulled respectively by controlling the driving device module I to respectively adjust the deflection angle, the bending angle and the finger opening and closing degree of the robot. The capture of the target can include the following two solutions: (1) when the target volume is small, the nimble finger module IV is used to simulate a human finger to grasp the target. Firstly, the rotary compression module II and the bending compression module III are adjusted by pulling the driving cables I 5 and the driving cables II 9 so that the nimble finger module IV surrounds the target. Then, the driving cables III 20 are pulled to close the nimble finger module IV to realize the grasping function for the small-volume target. (2) When the target object is large, the bending compression module III is used to simulate winding and wrapping of a trunk to grasp the target object. At this moment, the bending compression module III is in a follow-up state.

Compared with the prior art, the technical solution of the present disclosure has the following beneficial effects:

(1) Flexibility is high, and it is easy to realize flexible grasping of the small-volume target and winding of the large-volume target. Compared with the traditional robot structure, the present disclosure uses the design philosophy of the tensegrity structure as the design guide of structural design of a novel robot to give full play to the characteristics of the tensegrity structure, so as to realize the characteristics of bending deformation and torsional deformation of the robot.

(2) The robot is divided into the driving module, the rotary compression module, the bending compression module and the nimble finger module by using the modular design philosophy. Each module has clear division of labor, respectively realizes a specific function, and provides convenience for processing, manufacturing and maintenance. In addition, due to the modular design, the robot can be reconstructed according to different working conditions to realize different functions.

(3) Because the tensegrity structure is relatively abstract, the static model is used as the design guide. This process not only can effectively analyze the feasibility of structural design, but also can provide theoretical reference for component design.

(4) The design philosophy of the tensegrity structure is used for reference, except the driving module. The main structure is completely composed of lightweight components such as cables and rods, and the robot structure presents the characteristic of light weight.

In the figures: I driving device module; II rotary compression module; III bending compression module; IV nimble finger module; 2 upper connecting plate; 3 fixed spherical hinge; 4 movable spherical hinge; 5 driving cable I; 6 connecting rod; 7 elastic element I; 8 lower connecting plate; 9 driving cable II; 10 planar connecting rod; 11 interlayer connecting rod; 12 elastic element II; 13 fixing bolt; 14 rotating hinge; 15 transverse connecting rod; 16 finger root oblique connecting rod; 17 rotating hinge; 18 fingertip oblique connecting rod; 19 elastic element III; 20 driving cable III; 21 inter-finger connecting plate.

DETAILED DESCRIPTION

The conception, specific structure and generated technical effects of the present disclosure will be clearly and fully described below in combination with embodiments and drawings to fully understand the purposes, solutions and effects of the present disclosure. It should be explained that if there is no conflict, the embodiments in the present application and the features in the embodiments can be mutually combined.

Figure 1:
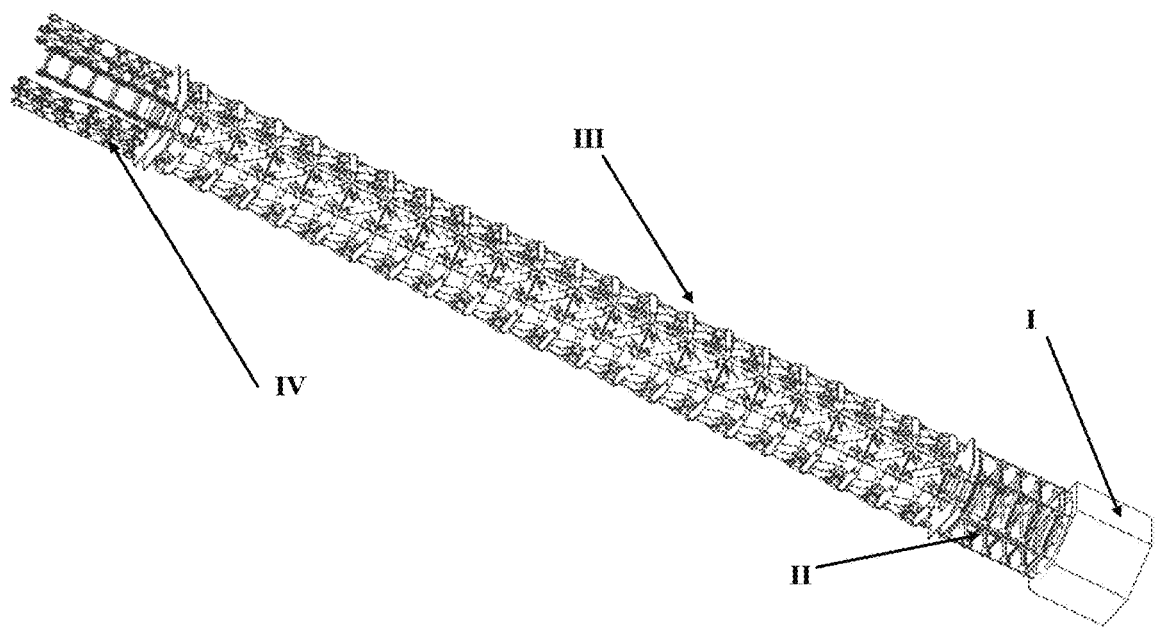
FIG. 1 is a module description diagram of a robot structure of the present disclosure.

As shown in FIG. 1, a multi-degree-of-freedom continuum robot with a flexible target grasping function comprises a driving device module I, a rotary compression module II, a bending compression module III and a nimble finger module IV. A stepping motor is preferably selected as a driving device of the driving device module I. The driving device module I and the rotary compression module II are connected through an upper connecting plate 2; the rotary compression module II and the bending compression module III are connected through a lower connecting plate 8; and the bending compression module III and the rotary compression module II are connected through an inter-finger connecting plate 21.

Figure 2:
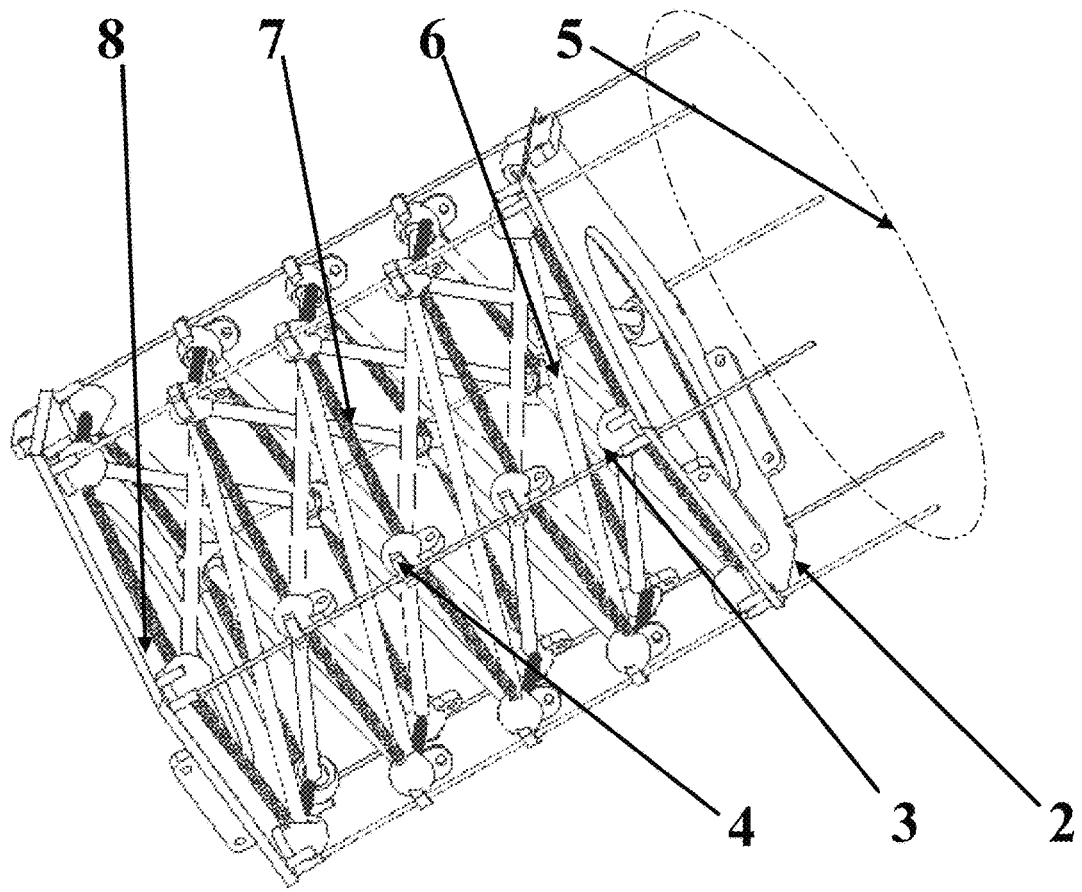
FIG. 2 is an assembly diagram of a rotary compression module of the present disclosure.

As shown in FIG. 2, the rotary compression module II comprises a module structure, driving cables I 5, elastic elements I 7, the upper connecting plate 2 and the lower connecting plate 8. The shape of the module structure is formed by six cross helical hinges imitating a DNA helix structure; each hinge comprises two fixed spherical hinges 3, three movable spherical hinges 4 and four connecting rods 6; twelve fixed spherical hinges 3 are divide equally into 2 groups, and uniformly distributed on the upper connecting plate 2 and the lower connecting plate 8 respectively; the fixed spherical hinges 3 are used as a head and a tail of each hinge; the movable spherical hinges 4 are used as middle hinges; each hinge is connected in series through the connecting rods 6 as connecting members; and a wire through hole is arranged beside each spherical hinge. In the module structure, the transverse adjacent movable spherical hinges 4 are connected through the elastic elements I 7, and the longitudinal adjacent movable spherical hinges 4 are connected through the driving cables I 5. The module structure comprises six driving cables I 5 evenly distributed along the module structure; one end of each driving cable I 5 successively penetrates through the wire through hole and is fixed on an end of the module; and the other end is fixed on the motor spindle.

Figure 3:
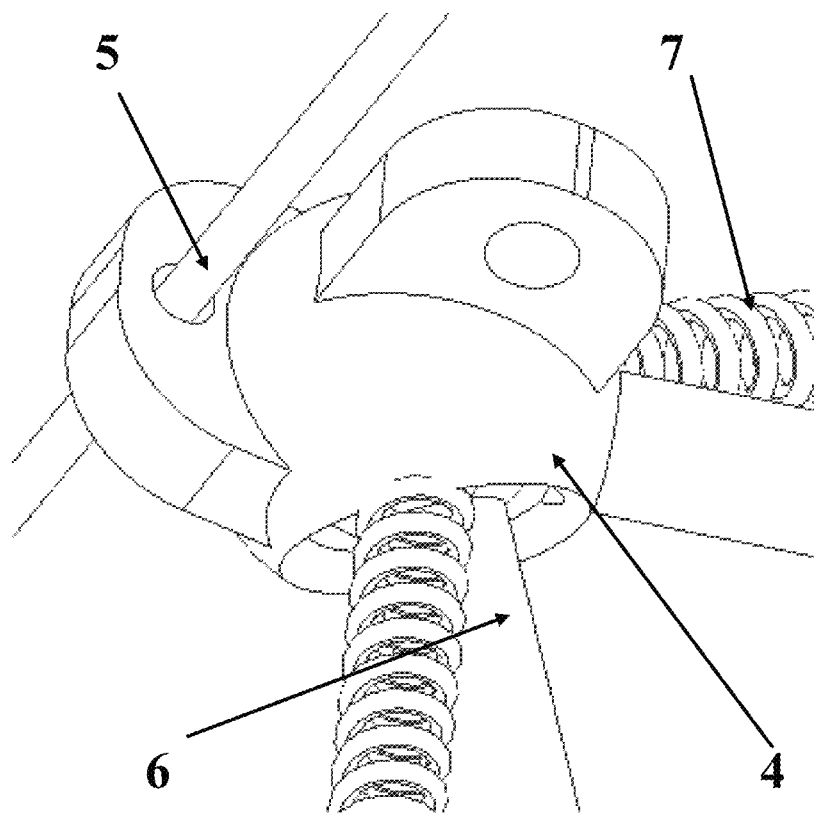
FIG. 3 is a connection diagram of a movable spherical hinge of the present disclosure.

As shown in FIG. 3, two elastic elements I 7, two connecting rods 6 and one driving cable 5 are connected on the periphery of each movable spherical hinge 4.

Figure 4:
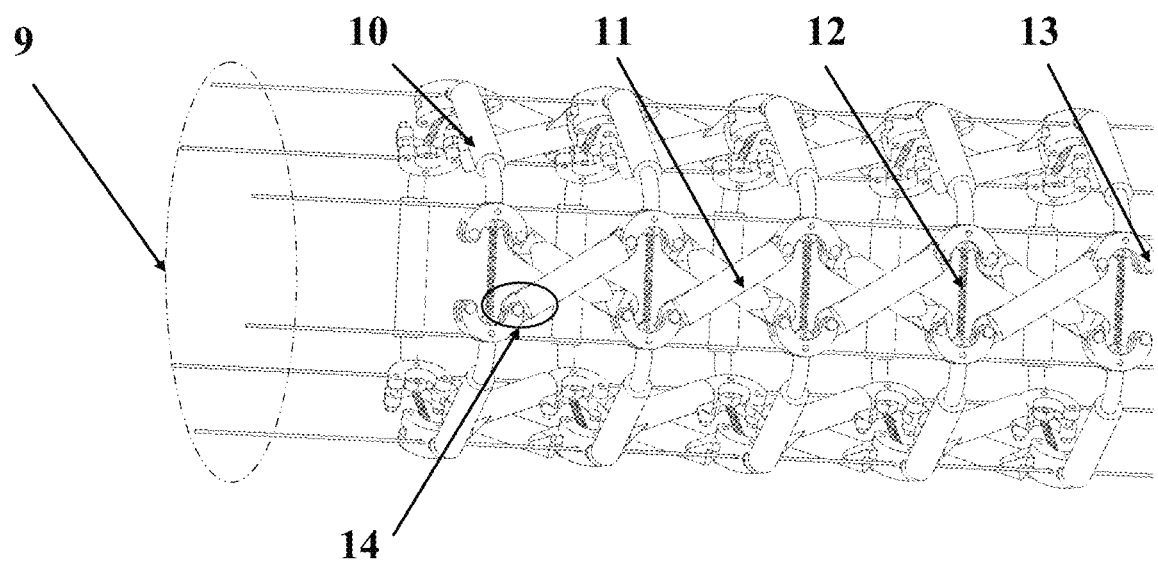
FIG. 4 is an assembly diagram of a bending compression module of the present disclosure.
Figure 5:
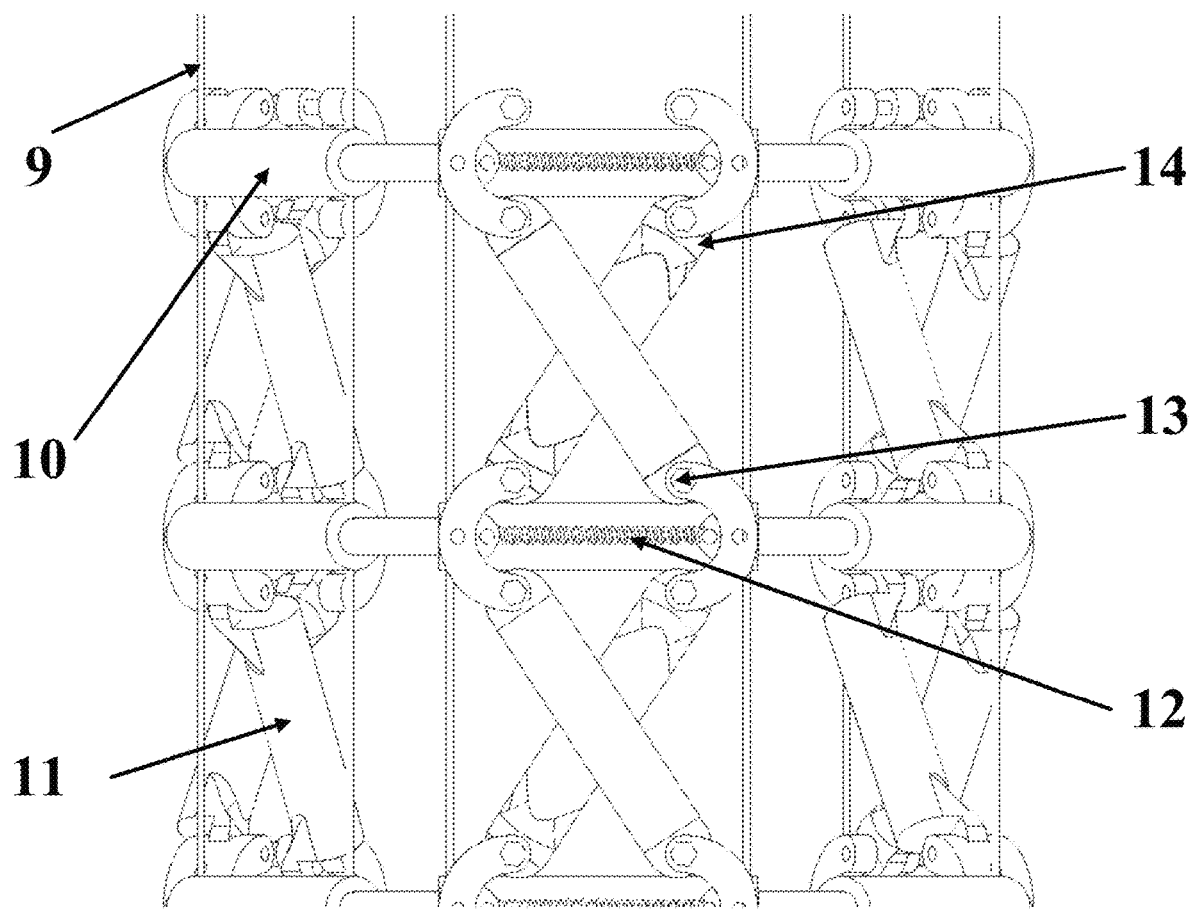
FIG. 5 is a local diagram of a bending compression module of the present disclosure.

As shown in FIG. 4 and FIG. 5, the bending compression module III comprises a multilayer tensegrity unit, interlayer connecting rods 11, rotating hinges 14 and the driving cable II 9. The appearance structure of the bending compression module III is formed by splicing multilayer prismatic tensegrity units in series through imitation of horizontal and vertical muscles of trunk muscles; each layer of the tensegrity unit is in a cyclization-like shape and comprises three planar connecting rods 10 and three elastic elements II 12 which are alternately connected; the six parts are alternately arranged to form tensegrity layer units; and adjacent tensegrity layer units are connected through six interlayer connecting rods 11; the rotating hinges 14 are installed on both sides of the interlayer connecting rods 11, and the rotating hinges 14 and the planar connecting rods 10 are connected through the fixing bolts 13. The wire through holes are formed in the planar connecting rods 10; and the bending compression module III penetrates through each small wire through hole longitudinally via six driving cables II 9, and is connected.

Figure 6:
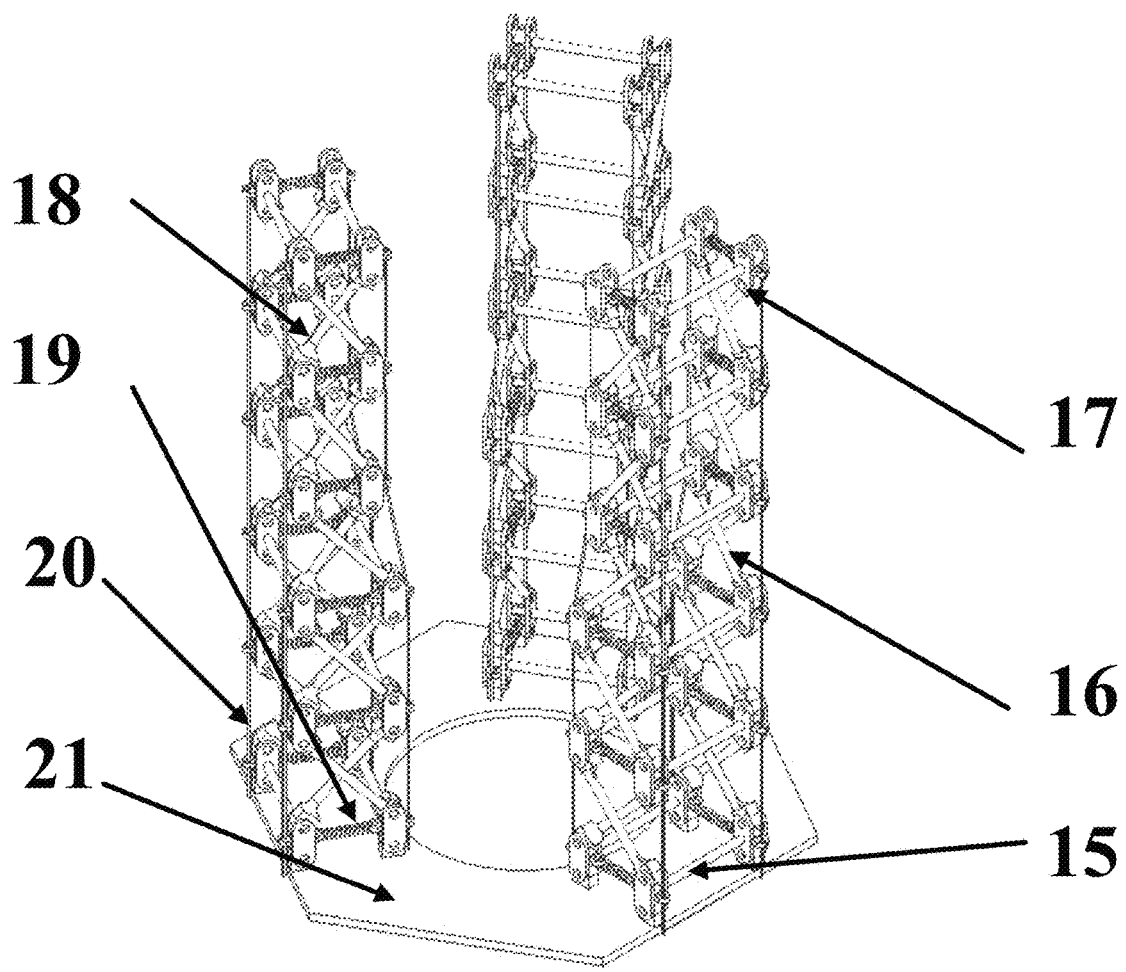
FIG. 6 is an assembly diagram of a nimble finger module of the present disclosure.

As shown in FIG. 6, the nimble finger module IV is composed of three equal-specification fingers and inter-finger connecting plates 21; and the three fingers are distributed on the inter-finger connecting plates 21 to realize the grasping function for an object.

Figure 7:
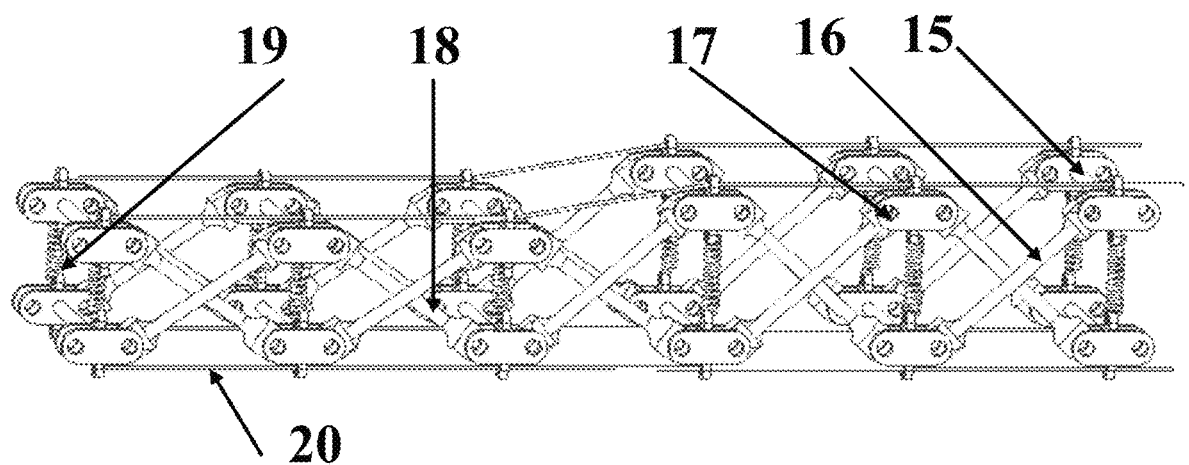
FIG. 7 is an assembly diagram of a nimble finger of the present disclosure.

As shown in FIG. 7, each finger comprises two parts: a finger root and a fingertip. A three-layer structure close to the inter-finger connecting plates 21 is the finger root; each layer is composed of two transverse connecting rods 15 and two elastic elements III 19 which are alternately connected, and two adjacent layers are connected through four finger root oblique connecting rods 16. A three-layer structure away from the inter-finger connecting plates 21 is the fingertip; each layer is composed of two transverse connecting rods 15 and two elastic elements III 19 which are alternately connected, and two adjacent layers are connected through four fingertip oblique connecting rods 18. The fingertips and the finger roots are connected through two finger root oblique connecting rods 16 and two fingertip oblique connecting rods 18. The transverse connecting rods 15 and the finger root oblique connecting rods 16 are connected by the rotating hinges 17, and the transverse connecting rods 15 and the fingertip oblique connecting rods 18 are connected by the rotating hinges 17. The wire through holes are formed on both sides of the transverse connecting rods 15; one end of four driving cables III 20 is respectively fixed on the motor, and the other end successively penetrates through the wire through holes on both sides of the transverse connecting rods 15 of the finger roots and the fingertips, and is fixed on the fingertip ends.

Figure 8:
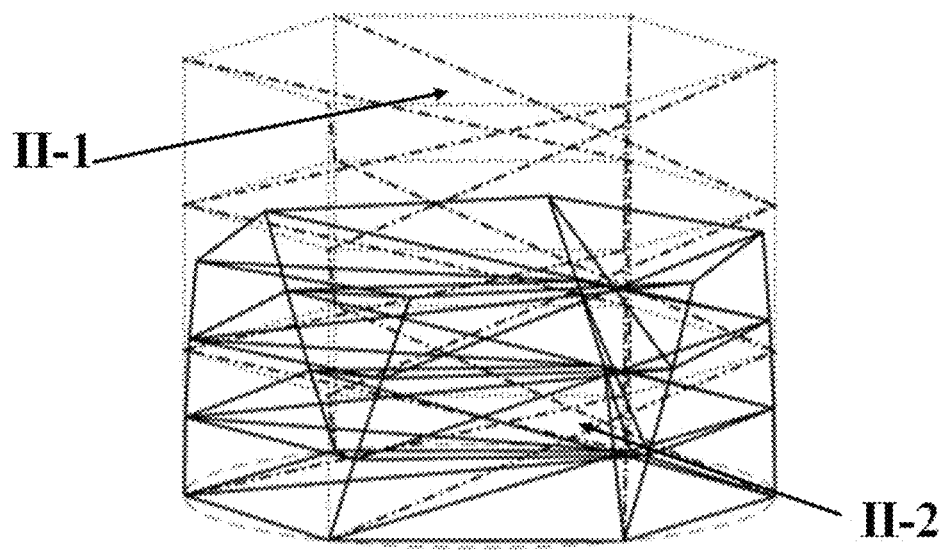
FIG. 8 is a schematic diagram of motion of a rotary compression module of the present disclosure.

As shown in FIG. 8, the dotted line part II-1 in the figure represents the initial configuration of the rotary compression module II. When the driving cables I 7 are simultaneously pulled, the rotary compression module II after spiral deformation is shown as the solid line part II-2.

Figure 9:
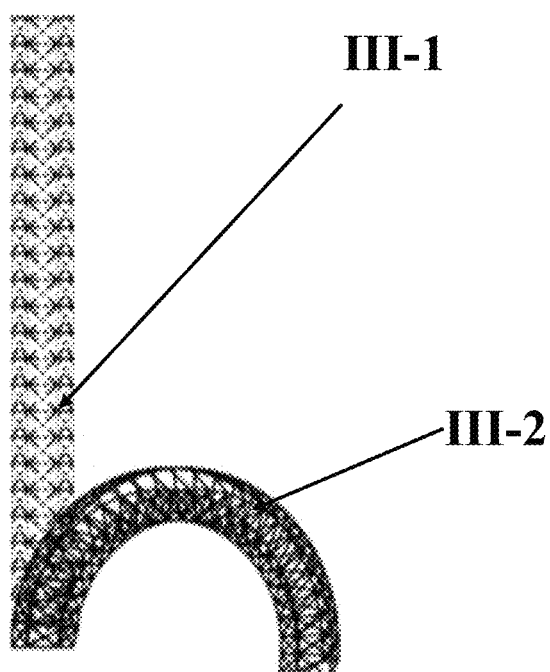
FIG. 9 is a schematic diagram of motion of a bending compression module of the present disclosure.

As shown in FIG. 9, the dotted line part III-1 in the figure represents the initial configuration of the bending compression module III. When the driving cables II 12 are pulled differentially, the bending compression module III after bending deformation is shown as the solid line part III-2.

Figure 10:
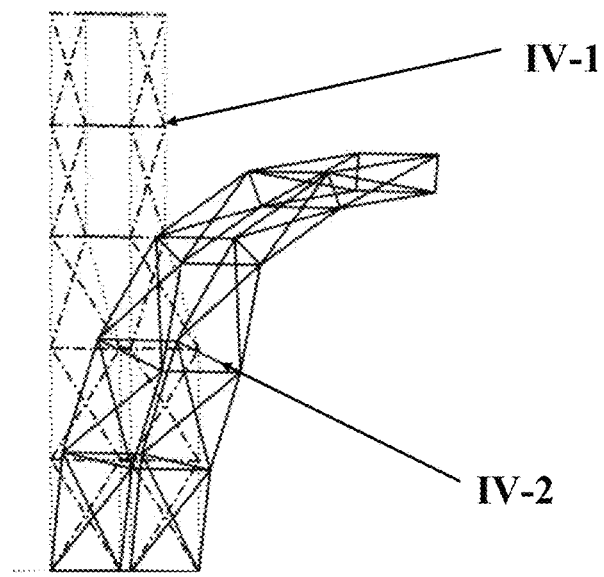
FIG. 10 is a schematic diagram of motion of a nimble finger of the present disclosure.

As shown in FIG. 10, the dotted line part IV-1 in the figure represents the initial configuration of a single finger in the nimble finger module IV. When the driving cables III 20 are pulled differentially, the nimble finger module after finger deformation is shown as the solid line part IV-2.

Figure 11:
FIG. 11 is a robot structure after staggered combination of module II and module III of the present disclosure.

The modules in FIG. 3, FIG. 5 and FIG. 7 are assembled to simultaneously realize the deformation shown in FIG. 9, FIG. 10 and FIG. 11.

As shown in FIG. 11, the present disclosure also provides a robot structure after staggered combination of module II and module III. The robot has more degrees of freedom, so that the robot motion can be more flexible.

The use process of the present disclosure is: the driving device module I, the rotary compression module II, the bending compression module III and the nimble finger module IV are assembled according to actual working conditions. The driving cables I 5, the driving cables II 9 and the driving cables III 20 are pulled respectively by controlling the driving device module I to respectively adjust the deflection angle, the bending angle and the finger opening and closing degree of the robot. The capture of the target can include the following two solutions: (1) when the target volume is small, the nimble finger module IV is used to simulate a human finger to grasp the target. Firstly, the rotary compression module II and the bending compression module III are adjusted by pulling the driving cables I 5 and the driving cables II 9 so that the nimble finger module IV surrounds the target. Then, the driving cables III 20 are pulled to close the nimble finger module IV to realize the grasping function for the small-volume target. (2) When the target object is large, the bending compression module III is used to simulate winding and wrapping of a trunk to grasp the target object. At this moment, the bending compression module III is in a follow-up state.

The above specifically explains preferred embodiments of the present disclosure. However, the creation of the present disclosure is not limited to the embodiments. Those skilled in the art familiar with the field can make various equivalent modifications or replacements without departing from the spirit of the present disclosure. All the equivalent modifications or replacements shall be included within the scope limited by the claims of the present application.

The invention claimed is:

1. A multi-degree-of-freedom continuum robot with a flexible target grasping function, wherein a basic structure of the multi-degree-of-freedom continuum robot is formed by combining and assembling a plurality of modules, comprising four parts: a driving device module, a rotary compression module, a bending compression module and a nimble finger module; the driving device module and the rotary compression module are connected through an upper connecting plate; the rotary compression module and the bending compression module are connected through a lower connecting plate; and the bending compression module and the nimble finger module are connected through an inter-finger connecting plate;

a wire spool, a gear set and a generator set needed for cable control are integrated in the driving device module to realize centralized control of driving cables I, driving cables II and driving cables III;

the rotary compression module is used for realizing circumferential rotation and axial contraction of the robot, and comprises a module structure, the driving cables I, elastic elements I, the upper connecting plate and the lower connecting plate; the shape of the module structure is formed by six cross helical hinges resulting in a DNA helix structure; each hinge comprises two fixed spherical hinges, three movable spherical hinges and four connecting rods; the twelve fixed spherical hinges are divided equally into two groups, and uniformly distributed on the upper connecting plate and the lower connecting plate respectively; the fixed spherical hinges are used as a head and a tail of each hinge; the movable spherical hinges are used as middle hinges; each hinge is connected in series through the connecting rods as connecting members; and a wire through hole is arranged beside each spherical hinge; in the module structure, transverse adjacent movable spherical hinges are connected through the elastic elements I, and longitudinal adjacent movable spherical hinges are connected through the driving cables I; the module structure comprises six driving cables I evenly distributed along the module structure; one end of each driving cable I successively penetrates through the wire through holes and is fixed on an end of the module, and another end is fixed on a motor spindle;

the bending compression module is used to realize a winding motion and axial telescopic motion of the robot to realize the function of winding large-volume targets, and comprises a multilayer tensegrity unit, interlayer connecting rods, rotating hinges and the driving cables II; a structure of the bending compression module is formed by splicing multilayer prismatic tensegrity units in series through imitation of horizontal and vertical muscles of trunk muscles; each layer of the tensegrity unit comprises three planar connecting rods and three elastic elements II which are alternately connected; the six parts are alternately arranged to form tensegrity layer units; and adjacent tensegrity layer units are connected through six interlayer connecting rods; the rotating hinges are installed on both sides of the interlayer connecting rods, and the rotating hinges and the planar connecting rods are connected through fixing bolts; wire through holes are formed in the planar connecting rods; one end of each driving cable II penetrates through each wire through hole longitudinally, and is fixed on an end of the module and another end is fixed on a motor spindle;

the nimble finger module having characteristics of a thick bottom and a thin tip of a human finger, and comprises three equal-specification fingers and inter-finger connecting plate; and the three fingers are distributed on the inter-finger connecting plate to realize the grasping function for a small-volume target; each finger comprises two parts: a finger root and a fingertip; the finger root is divided into three layers; each layer is composed of two transverse connecting rods and two elastic elements III which are alternately connected, and two adjacent layers are connected through finger root oblique connecting rods; the basic structure of the fingertip is similar to the structure of the finger root; each layer is composed of two transverse connecting rods and two elastic elements III which are alternately connected, and two adjacent layers are connected through fingertip oblique connecting rods; the fingertips and the finger roots are connected through the finger root oblique connecting rods and two fingertip oblique connecting rods; rotating hinges are installed on both sides of the finger root oblique connecting rods and the fingertip oblique connecting rods; the transverse connecting rods and the finger root oblique connecting rods are connected by the rotating hinges, and the transverse connecting rods and the fingertip oblique connecting rods are connected by the rotating hinges; the wire through holes are formed on both sides of the transverse connecting rods; one end of four driving cables III is respectively fixed on a motor spindle, and another end successively penetrates through the wire through holes on both sides of the transverse connecting rods of the finger roots and the fingertips, and is fixed on an end of the fingertips.

2. The multi-degree-of-freedom continuum robot with the flexible target grasping function according to claim 1, wherein the connecting rods are connected through the elastic elements I with elastic deformation capacity.

3. The multi-degree-of-freedom continuum robot with the flexible target grasping function according to claim 1, wherein the driving cables I, the driving cables II and the driving cables III are polyethylene nylon cables.

\* \* \* \* \*